US009843706B2

(12) United States Patent
Chern et al.

(10) Patent No.: US 9,843,706 B2
(45) Date of Patent: Dec. 12, 2017

(54) OPTICAL APPARATUS

(71) Applicant: EVERREADY PRECISION IND. CORP., Kaohsiung (TW)

(72) Inventors: Jyh-Long Chern, Taipei (TW); Chih-Ming Yen, New Taipei (TW)

(73) Assignee: EVERREADY PRECISION IND. CORP., Kaohsiung (TW)

( * ) Notice: Subject to any disclaimer, the term of this patent is extended or adjusted under 35 U.S.C. 154(b) by 28 days.

(21) Appl. No.: 14/883,057

(22) Filed: Oct. 14, 2015

(65) Prior Publication Data

US 2016/0124197 A1 May 5, 2016

(30) Foreign Application Priority Data

Oct. 31, 2014 (TW) ............................ 103137847 A
Aug. 28, 2015 (CN) ......................... 2015 1 0541081

(51) Int. Cl.
*H04N 5/228* (2006.01)
*H04N 5/225* (2006.01)
*G02B 13/00* (2006.01)
*G02B 3/00* (2006.01)

(52) U.S. Cl.
CPC ......... *H04N 5/2253* (2013.01); *G02B 3/0043* (2013.01); *G02B 3/0062* (2013.01); *G02B 3/0075* (2013.01); *G02B 13/0085* (2013.01); *H04N 5/2254* (2013.01)

(58) Field of Classification Search
CPC .. H04N 5/2257; H04N 5/2253; H04N 5/2254; H04N 5/23212; H04N 5/23287; G03B 3/10; G03B 5/00; G03B 13/36; G03B 2205/0053; H01L 27/14625
See application file for complete search history.

(56) References Cited

U.S. PATENT DOCUMENTS

| | | | | |
|---|---|---|---|---|
| 7,453,517 | B2 * | 11/2008 | Fujimoto | H04N 5/2254 348/374 |
| 7,619,683 | B2 * | 11/2009 | Davis | H04N 5/2254 348/211.1 |
| 7,929,033 | B2 * | 4/2011 | Lee | H01L 25/043 250/208.1 |
| 8,660,420 | B2 * | 2/2014 | Chang | G03B 35/08 396/326 |
| 9,071,721 | B1 * | 6/2015 | D'Amico | H04N 9/04 |
| 2005/0253951 | A1 * | 11/2005 | Fujimoto | H04N 5/2253 348/335 |
| 2010/0231779 | A1 * | 9/2010 | Lin | G02B 7/021 348/335 |

* cited by examiner

*Primary Examiner* — Trung Diep

(74) *Attorney, Agent, or Firm* — Muncy, Geissler, Olds & Lowe, P.C.

(57) ABSTRACT

An optical apparatus includes plural optical lens groups, an optical sensor and a casing. After a light beam passes through any of the plural optical lens groups, a travelling direction of the light beam is changed. Moreover, after the light beam passes through at least one of the plural optical lens groups, the light beam is sensed by the optical sensor and converted into an image signal by the optical sensor. The plural optical lens groups and the optical sensor are accommodated and fixed within the casing. The optical apparatus has a single optical lens module, and is able to implement different optical function simultaneously. Consequently, the overall volume of the optical apparatus is minimized, and the fabricating cost of the optical apparatus is reduced.

16 Claims, 4 Drawing Sheets

OPTICAL APPARATUS

FIELD OF THE INVENTION

The present invention relates to an optical apparatus, and more particularly to an optical image capturing apparatus.

BACKGROUND OF THE INVENTION

FIG. 1 schematically illustrates the structure of a conventional image capturing unit. As shown in FIG. 1, the image capturing unit 1 comprises an optical lens group 11, an image sensor 12 and a casing 13. The optical lens group 11 comprises at least one lens for allowing an ambient light beam to pass through. After the light beam passing through the optical lens group 11 is sensed by the image sensor 12, the light beam is converted into an image signal by the image sensor 12. According to the image signal, a corresponding image is shown on a display device. The optical lens group 11 and the image sensor 12 are accommodated within the casing 13 and securely positioned in the casing 13. Consequently, the optical lens group 11 and the image sensor 12 can be normally operated. In FIG. 1, the individual image capturing unit 1 is shown. However, since the current optical technology is increasingly developed, the image capturing unit 1 can be minimized and installed in a portable electronic communication product.

Moreover, the image capturing unit 1 of FIG. 1 is able to capture a single image in each capturing process. For solving this drawbacks, plural image capturing units 1 are combined together in order to capture plural images at the same time.

FIG. 2 schematically illustrates the structure of a conventional array-type image capturing apparatus. As shown in FIG. 2, the array-type image capturing apparatus 2 comprises a frame 21 and plural image capturing units 1. The plural image capturing units 1 are in an array arrangement and in a rectangular distribution through the frame 21. Moreover, the image signals corresponding to the images acquired by the plural image capturing units 1 are transmitted to a back-end processor (not shown). After the image signals are integrated and processed by the back-end processor, the integrated image is shown on a display device.

Generally, the array-type image capturing apparatus 2 is able to capture plural images in each capturing process. However, the optical functions provided by the plural image capturing units 1 are identical. For example, the optical axes of the plural image capturing units 1 are along the same direction. That is, there is no inclined angle between any two optical axes. Alternatively, all image capturing units 1 have the same field of view (FOV) or the same effective focal length (efl) effectively.

Due to the limitations of the fabricating process of the current array-type image capturing apparatus 2, the imaging quality of the image capturing unit 1 is usually insufficient. For example, the image capturing unit 1 usually has a resolution of 1M~2M pixels. Under this circumstance, the function provided by the array-type image capturing apparatus 2 is limited. Moreover, since the array arrangement of the array-type image capturing apparatus 2 is complicated and plural image capturing units 1 are contained in the array-type image capturing apparatus 2, the applications thereof are restricted because of the high cost.

FIG. 3 schematically illustrates the structure of another conventional image capturing apparatus. As shown in FIG. 3, the image capturing apparatus 9 comprises plural lens modules 91 and a casing 92. The lens modules 91 are fixed by the casing 92. Each lens module 91 comprises an optical lens group 911 and an optical sensor (not shown). Moreover, the image signals corresponding to the images acquired by the plural lens modules 91 are transmitted to a processor (not shown). The processor may be built in the casing 92. After the image signals are integrated and processed by the processor, a three-dimensional image is produced or shown on a display device. Likewise, the image capturing apparatus 9 is able to capture plural images in each capturing process. However, since plural optical sensors are installed within the casing 92, the volume reduction of the image capturing apparatus 9 is not obvious.

Therefore, while both of the overall volume and the fabricating cost are taken into consideration, it is an important issue to allow the image capturing apparatus to capture plural images in each capturing process and allow the image capturing apparatus to flexibly provide different optical functions to achieve required optical efficacy according to the practical requirements.

SUMMARY OF THE INVENTION

For solving the drawbacks of the conventional technology, the present invention provides an optical apparatus. The optical apparatus has a single optical lens module, and is able to implement different optical function simultaneously. Consequently, the overall volume of the optical apparatus is minimized, and the fabricating cost of the optical apparatus is reduced.

In accordance with an aspect of the present invention, there is provided an optical apparatus. The optical apparatus includes plural optical lens groups, an optical sensor and a casing. After a light beam passes through any of the plural optical lens groups, a travelling direction of the light beam is changed. After the light beam passes through at least one of the plural optical lens groups, the light beam is sensed by the optical sensor. The plural optical lens groups and the optical sensor are accommodated and fixed within the casing.

In an embodiment, the optical apparatus satisfies a mathematic formula:

$$0.75 \cdot A_s < \sum_{j=1}^{n} A_{C,j} < 1.5 \cdot A_s$$

wherein $A_s$ is an effective sensing range of the optical sensor, $A_{c,j}$ is a projection range of the j-th optical lens group relative to the optical sensor, and n is a number of the plural optical lens groups.

In an embodiment, the optical apparatus satisfies a mathematic formula:

$$0.3 \cdot f_{avg} < \Delta f < 1.2 \cdot f_{avg}$$

wherein $f_{avg}$ is an average of focal lengths of the plural optical lens groups, and $\Delta f$ is the largest focal length difference between the focal lengths of the plural optical lens groups.

In an embodiment, the plural optical lens groups include a first optical lens group with a first optical axis and a second optical lens group with a second optical axis, wherein the first optical axis and the second optical axis are not overlapped with each other.

In an embodiment, the plural optical lens groups have respective optical axes, wherein an inclined angle between any two of the optical axes of the plural optical lens groups is smaller than 10 degrees.

In an embodiment, the plural optical lens groups have respective optical axes, wherein an inclined angle between any two of the optical axes of the plural optical lens groups is more than 10 degrees in which additional one or several reflective elements are included.

In an embodiment, the optical apparatus includes at least one filter. The at least one filter is arranged between the plural optical lens groups and the optical sensor. After the light beam passes through any of the plural optical lens groups, a portion of the light beam is filtered and sieved by the at least one filter.

In an embodiment, a visible light beam, an infrared light beam, a near infrared light beam and/or a far infrared light beam is blocked by the at least one filter.

In an embodiment, the optical apparatus further includes a light shielding plate. The light shielding plate is located at front sides of the plural optical lens groups, and the light shielding plate has plural perforations corresponding to the plural optical lens groups.

In an embodiment, one of the plural optical lens groups is a center optical lens group, and the other optical lens groups of the plural optical lens groups are peripheral optical lens groups around the center optical lens group.

In an embodiment, the plural optical lens groups include a first optical lens group with a first lens and a second optical lens group with a second lens, wherein the first lens and the second lens are integrally formed with each other.

In an embodiment, plural optical lens groups comprise a visible optical lens group and an invisible optical lens group. After at least one visible light beam passes through the visible optical lens group, a travelling direction of the at least one visible light beam is changed. After at least one invisible light beam passes through the invisible optical lens group, a travelling direction of the at least one invisible light beam is changed.

In an embodiment, each of the plural optical lens groups includes a single lens or plural lenses in a stack arrangement. Each lens is made of a plastic material, a glass material or a silicon-based material.

In an embodiment, the plural optical lens groups include four optical lens groups or more than four optical lens groups.

In an embodiment, the optical apparatus is an optical image capturing apparatus.

From the above descriptions, the present invention provides the optical apparatus. The plural optical lens groups of the optical apparatus are designed according to different optical functions. Moreover, the plural optical lens groups are fixed in the same casing, and the same optical sensor is shared by the plural optical lens groups. Consequently, the optical apparatus of the present invention has a single optical lens module, and is able to implement different optical function simultaneously. Under this circumstance, the overall volume of the optical apparatus is minimized, and the fabricating cost of the optical apparatus is reduced.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
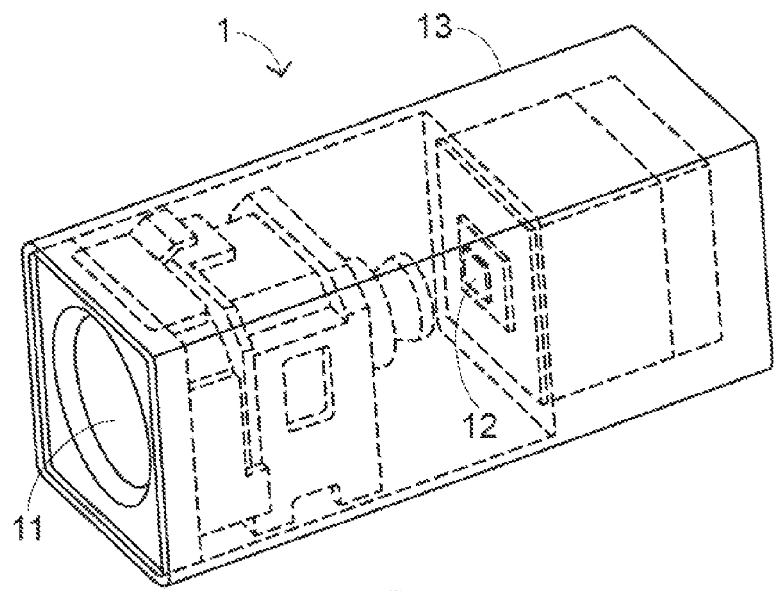
FIG. 1 schematically illustrates the structure of a conventional image capturing unit.
Figure 2:
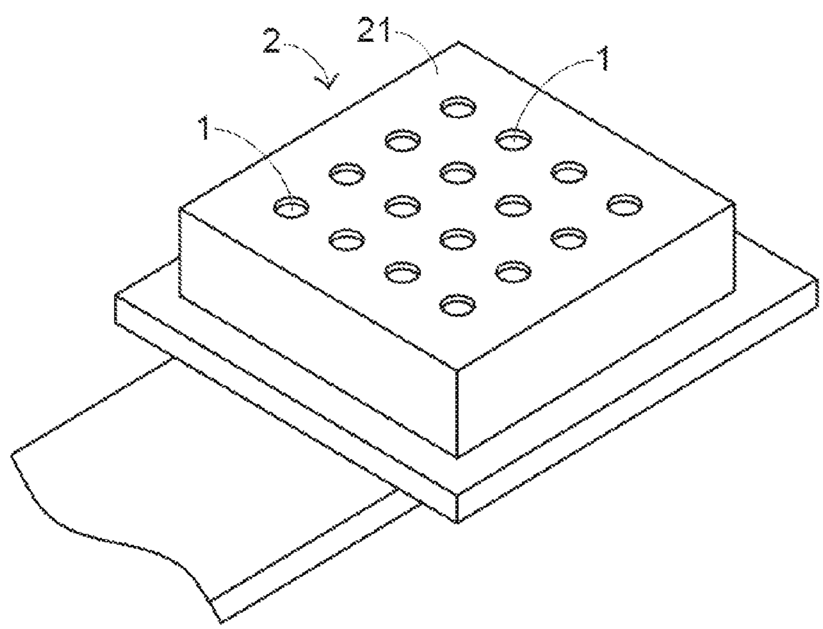
FIG. 2 schematically illustrates the structure of a conventional array-type image capturing apparatus.
Figure 3:
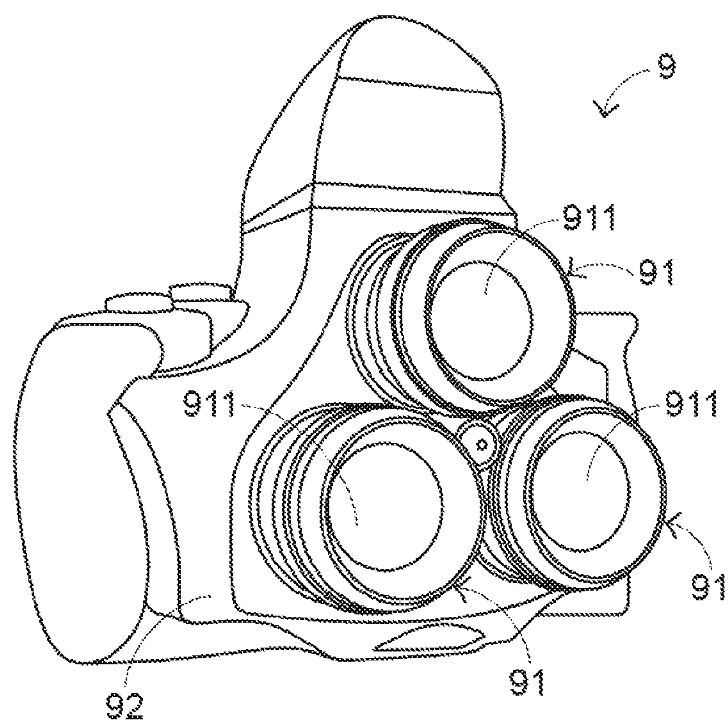
FIG. 3 schematically illustrates the structure of another conventional image capturing apparatus.
Figure 4:
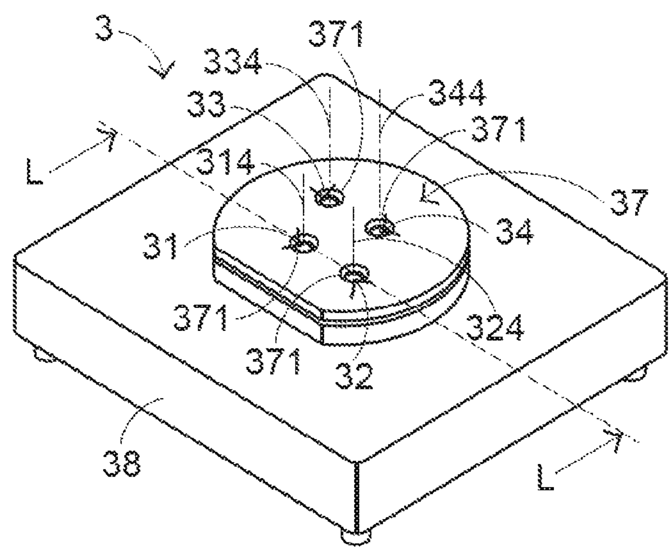
FIG. 4 is a schematic perspective view illustrating the outer appearance of an optical apparatus according to a first embodiment of the present invention.
Figure 5:
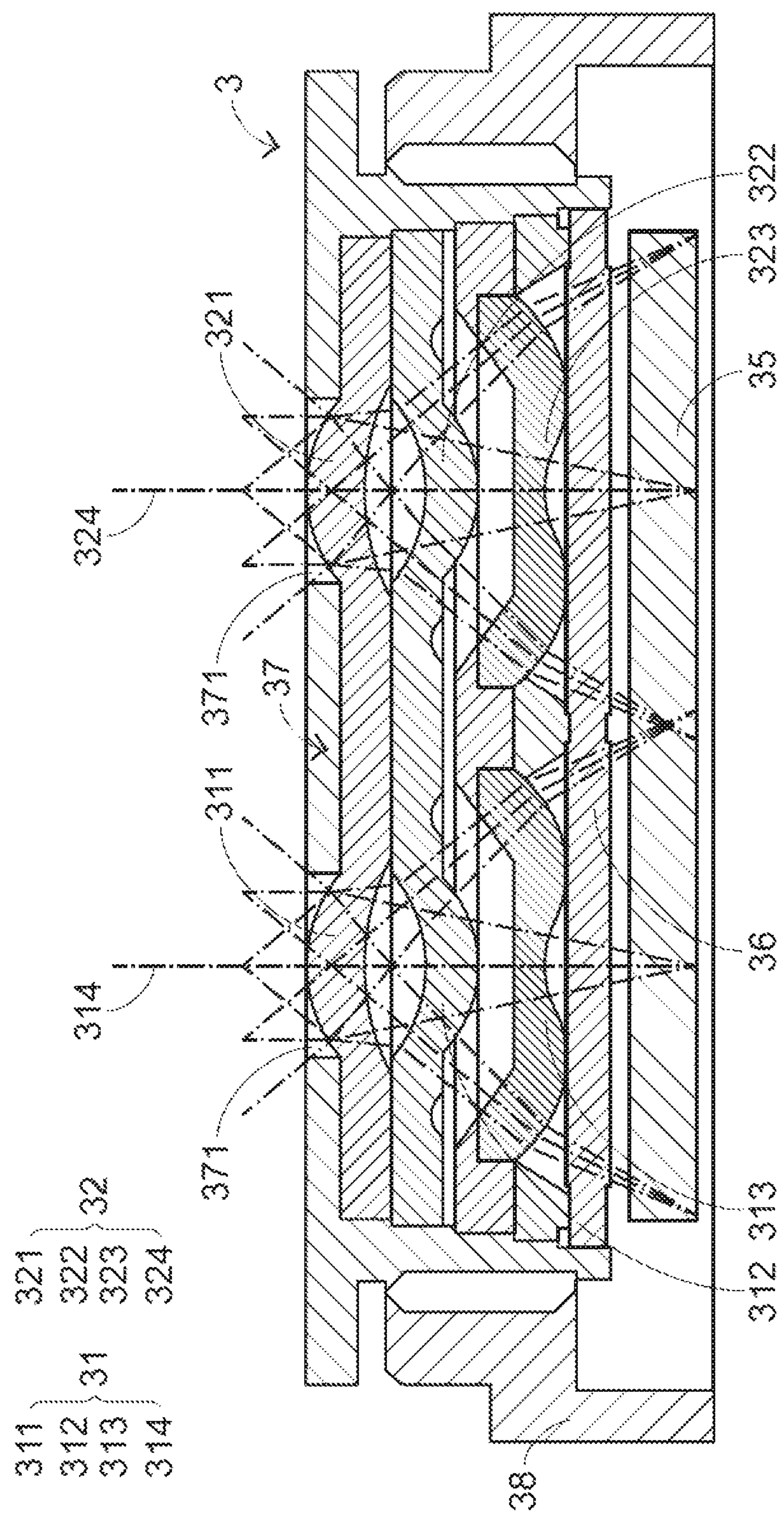
FIG. 5 is a schematic cross-sectional view illustrating a portion of the optical apparatus of FIG. 4 and taken along the line L-L.

Please refer to FIGS. 4 and 5. FIG. 4 is a schematic perspective view illustrating the outer appearance of an optical apparatus according to a first embodiment of the present invention. FIG. 5 is a schematic cross-sectional view illustrating a portion of the optical apparatus of FIG. 4 and taken along the line L-L. In this embodiment, the optical apparatus 3 is an optical image capturing apparatus. The optical apparatus 3 comprises a first optical lens group 31, a second optical lens group 32, a third optical lens group 33, a fourth optical lens group 34, an optical sensor 35, a filter 36, a light shielding plate 37 and a casing 38. The optical lens groups 31~34, the optical sensor 35, the filter 36 and the light shielding plate 37 are accommodated within the casing 38. The first optical lens group 31 comprises a first lens 311, a third lens 312 and a fifth lens 313, which are sequentially arranged along the direction of a first optical axis 314. The second optical lens group 32 comprises a second lens 321, a fourth lens 322 and a sixth lens 323, which are sequentially arranged along the direction of a second optical axis 324. Similarly, the third optical lens group 33 comprises plural lenses (not shown), which are sequentially arranged along the direction of a third optical axis 334, and the fourth optical lens group 34 comprises plural lenses (not shown), which are sequentially arranged along the direction of a fourth optical axis 344. The arrangement sequences of the lenses of the third optical lens group 33 and the fourth optical lens group 34 are identical to or different from the arrangement sequences of the lenses of the first optical lens group 31 and the second optical lens group 32.

Moreover, when light beams pass through any of the optical lens groups 31~34, the travelling directions of the light beams are changed. After the light beams pass through any of the optical lens groups 31~34, the light beams are received by the optical sensor 35 and converted into an image signal by the optical sensor 35. The image signal is processed by a signal processor (not shown) or shown on a display device (not shown).

Moreover, each lens is made of a plastic material, a glass material or a silicon-based material. As shown in FIG. 5, each of the first optical lens group 31 and the second optical lens group 32 comprises plural lenses, which are in a stack arrangement. It is noted that the number of lenses is not restricted. For example, in some embodiments, each of the optical lens groups 31~34 only comprises a single lens.

Preferably but not exclusively, the first lens 311 of the first optical lens group 31, the second lens 321 of the second optical lens group 32, the corresponding lens of the third optical lens group 33 and the corresponding lens of the fourth optical lens group 34 are connected with each other.

That is, these lenses are integrally formed on a single transparent structure. Similarly, the third lens 312 of the first optical lens group 31, the fourth lens 322 of the second optical lens group 32, the corresponding lens of the third optical lens group 33 and the corresponding lens of the fourth optical lens group 34 are connected with each other. That is, these lenses are integrally formed with each other. Similarly, the fifth lens 313 of the first optical lens group 31, the sixth lens 323 of the second optical lens group 32, the corresponding lens of the third optical lens group 33 and the corresponding lens of the fourth optical lens group 34 are connected with each other. That is, these lenses are integrally formed with each other.

Since the corresponding lenses of the optical lens groups 31~34 are integrally formed with each other, the optical apparatus 3 can be assembled more easily. Moreover, since the optical apparatus 3 has the advantage of miniaturization, the optical apparatus 3 can be applied to a handheld mobile device such as a mobile phone, a tablet computer or any other wearable device.

The light shielding plate 37 is located at the front sides of the optical lens groups 31~34. Moreover, the light shielding plate 37 has plural perforations 371 corresponding to the optical lens groups 31~34. That is, the optical lens groups 31~34 are exposed outside through the corresponding perforations 371. Consequently, the ambient light beams can be introduced into the optical lens groups 31~34. The light shielding plate 37 is used for sheltering the surrounding stray light around the optical lens groups 31~34. Consequently, the optical resolution of the light beams to be sensed by the optical sensor 35 will be enhanced.

The filter 36 is arranged between the optical lens groups 31~34 and the optical sensor 35. After the light beams pass through the optical lens groups 31~34, portions of the light beams are filtered and sieved by the filter 36. Consequently, the light beams received by the optical sensor 35 are useful light beams. For example, according to the practical requirements, the filter 36 is designed to block visible light beams, infrared light beams, near infrared light beams and/or far infrared light beams.

Moreover, these optical lens groups 31~34 have respective focal lengths. Since the optical lens groups 31~34 may comprise different numbers and/or different optical properties of lenses, the focal lengths of any two optical lens groups are identical or different. In an embodiment, $f_{avg}$ is an average of the focal lengths of the optical lens groups 31~34, $\Delta f$ is the difference between the largest focal length and the smallest focal length of the optical lens groups 31~34 (i.e., the largest focal length difference). Moreover, the optical apparatus 3 satisfies the following mathematic formula:

$$0.3 \cdot f_{avg} < \Delta f < 1.2 \cdot f_{avg}$$

That is, the difference between the largest focal length and the smallest focal length of the optical lens groups 31~34 (i.e., the largest focal length difference) is in the range between $0.3 \times f_{avg}$ and $1.2 \times f_{avg}$. Under this circumstance, the optical apparatus 3 has better imaging performance. In general, the FOV is not restricted here. For a wider FOV for one view, the corresponding efl should be shorter, while for a smaller FOV for the other view, the corresponding efl will be lager such that the opening of the light entrance can be minimized.

In this apparatus, the corresponding FOV could be different and may follow a rule that a wider FOV of one view (one lens group) is taken with shorter efl while a smaller FOV for the other views (lens groups) is adopted with a longer efl such that the opening of light (image) entrance can be minimized.

In an embodiment, the inclined angle between any two of the first optical axis 314 of the first optical lens group 31, the second optical axis 324 of the second optical lens group 32, the third optical axis of the third optical lens group 33 and the optical axis 344 of the fourth optical lens group 34 (i.e., an optical axis angle difference) is smaller than 10 degrees. Consequently, the imaging performance of the optical apparatus 3 is enhanced.

In an embodiment, the inclined angle between any two of the optical axes of the plural optical lens groups is more than 10 degrees when the lens groups are embedding with additional reflective optical elements.

Figure 6:
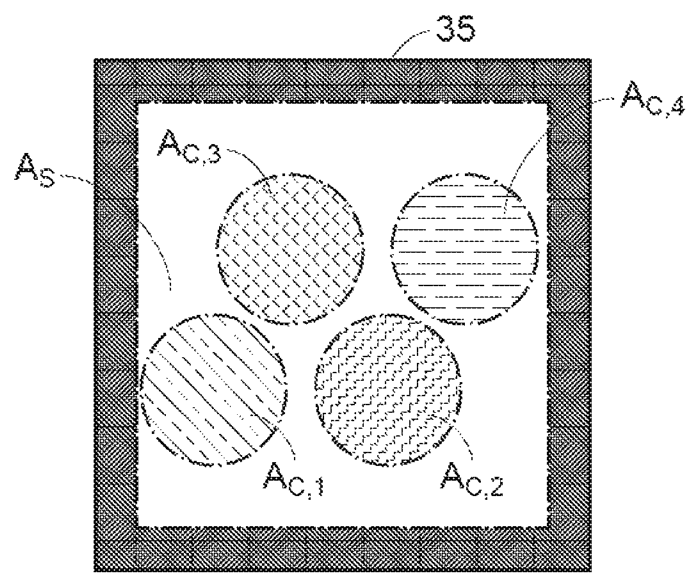
FIG. 6 schematically illustrates the projecting relationships between the plural optical lens groups and the optical sensor of FIG. 5.

FIG. 6 schematically illustrates the projecting relationships between the plural optical lens groups and the optical sensor of FIG. 5. In FIG. 6, $A_s$ is an effective sensing range of the optical sensor 35, and $A_{c,1}$, $A_{c,2}$, $A_{c,3}$ and $A_{c,4}$ are respective projection ranges of the first optical lens group 31, the second optical lens group 32, the third optical lens group 33 and the fourth optical lens group 34 relative to the optical sensor 35. In this embodiment, the optical apparatus 3 satisfies the following mathematic formula:

$$0.75 \cdot A_S < A_{C,1} + A_{C,2} + A_{C,3} + A_{C,4} < 1.5 \cdot A_S$$

That is, the total of the projection ranges of the optical lens groups 31~34 relative to the optical sensor 35 is 75%~150% of the effective sensing range of the optical sensor 35. Consequently, the performance of converting the received light beam into the image signal by the optical sensor 35 will be enhanced.

In case that the number of the plural optical lens groups is 4, the above mathematic formula may be expressed as:

$$0.75 \cdot A_s < \sum_{j=1}^{n} A_{C,j} < 1.5 \cdot A_s$$

In the above mathematic formula, $A_s$ is an effective sensing range of the optical sensor 35, $A_{c,j}$ is a projection range of the j-th optical lens group relative to the optical sensor 35, and n is a number of the plural optical lens groups.

It should be noted herein is that the corresponding sensing ranges may be filtered with different spectral domains and may be also relative to different arrangements of micro-lens array such that the corresponding chief ray angle (CRA) and relative illumination (RI) are fitted to the demanded effectively.

The optical sensing range has to follow the request on the distribution of chief ray angle (CRA). Typical arrangement of RGB or the other type of non-Bayer sensors may not fit well to the demands of CRA or relative illumination (RI). But the sensing range should be defined as well to have better performance.

Please refer to Table 1 as follows. Table 1 schematically illustrates some use examples about the deployment of the plural optical lens groups of the optical apparatus as shown in FIG. 4.

TABLE 1

| Use example | First optical lens group | Second optical lens group | Third optical lens group | Fourth optical lens group |
|---|---|---|---|---|
| 1 | I | I | I | I |
| 2 | I | I | I | F |
| 3 | I | I | F | F |
| 4 | I | F | F | F |
| 5 | F | F | F | F |

In Table I, the symbol "I" denotes the optical lens group having a first optical function, and the symbol "F" denotes the optical lens group having a second optical function. Moreover, five use examples of the optical apparatus 3 are also shown in Table 1. In the first use example, the optical lens groups 31~34 are the optical lens groups having the first optical function. In the second use example, the fourth optical lens group 34 is the optical lens group having the second optical function, and the optical lens groups 31~33 are the optical lens groups having the first optical function. In the third use example, the first optical lens group 31 and the second optical lens group 32 are the optical lens groups having the first optical function, and the third optical lens group 33 and the fourth optical lens group 34 are the optical lens groups having the second optical function. In the fourth use example, the first optical lens group 31 is the optical lens group having the first optical function, and the optical lens groups 32~34 are the optical lens groups having the second optical function. In the fifth use example, the optical lens groups 31~34 are the optical lens groups having the second optical function.

In an embodiment, the first optical function and the second optical function are a wide-angle imaging function and a non-wide angle imaging function, respectively. In another embodiment, the first optical function and the second optical function are a long-distance imaging function and a short-distance imaging function, respectively. It is noted that the examples of the first optical function and the second optical function are not restricted. Moreover, in any of the above use examples, any two of the optical lens groups with the same optical function may have different optical parameters. For example, if two optical lens groups in a specified use example are the optical lens groups with the long-distance imaging function, these two optical lens groups have different focal lengths. The above use examples of the optical lens groups 31~34 are presented herein for purpose of illustration and description only. That is, the use examples of the optical lens groups 31~34 may be varied according to the practical requirements. For example, in some embodiments, these optical lens groups 31~34 have different optical functions.

Figure 7:
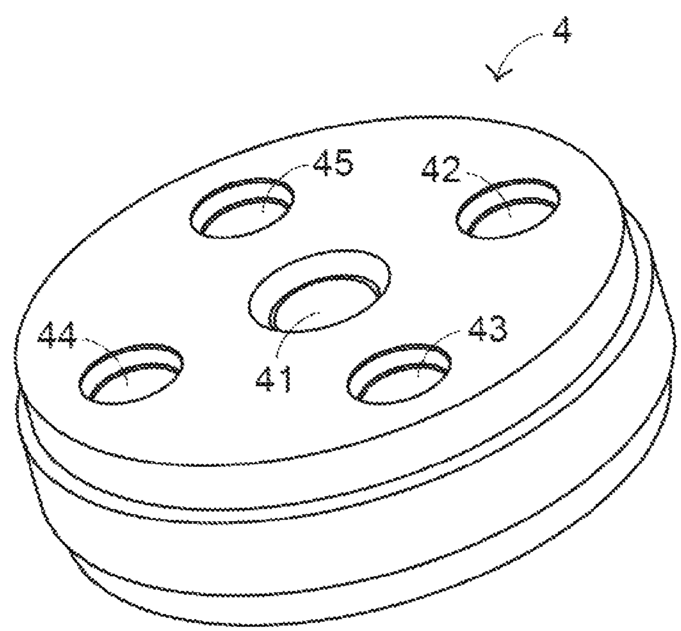
FIG. 7 is a schematic perspective view illustrating the outer appearance of an optical apparatus according to a second embodiment of the present invention.

FIG. 7 is a schematic perspective view illustrating the outer appearance of an optical apparatus according to a second embodiment of the present invention. The components of the optical apparatus 4 of this embodiment which are similar to the optical apparatus of the first embodiment are not redundantly described herein. In comparison with the first embodiment, the optical apparatus 4 comprises plural optical lens groups 41~45. The optical lens group 41 of the plural optical lens groups is a center optical lens group, and the other optical lens groups 42~45 of the plural optical lens groups are peripheral optical lens groups around the center optical lens group.

Optionally, the optical lens group 42 and the optical lens group 43 of FIG. 7 are a visible optical lens group and an invisible optical lens group, respectively. After a visible light beam passes through the visible optical lens group, a travelling direction of the visible light beam is changed. After an invisible light beam passes through the invisible optical lens group, a travelling direction of the invisible light beam is changed.

It is noted that the present invention is limited to the above two embodiments. Those skilled in the art will readily observe that numerous modifications and alterations may be made while retaining the teachings of the invention. For example, in a variant example, the optical apparatus is not equipped with the filter 36. In another variant example, the optical apparatus is not equipped with the light shielding plate 37. In the above embodiments, the light shielding plate 37 is located at the front sides of the optical lens groups. In some other embodiments, the light shielding plate 37 is located at another proper position of the optical apparatus. For example, the light shielding plate 37 is arranged between two optical lens groups, or the light shielding plate 37 is arranged between two lenses of a specified optical lens group.

In the above embodiments, the optical apparatus comprises a single filter 36. In some other embodiments, the optical apparatus comprises plural filters corresponding to plural optical lens groups. Optionally, according to the special requirements, any two filters are designed to block the same kind of light beams or block different kinds of light beams.

From the above descriptions, the present invention provides the optical apparatus. The plural optical lens groups of the optical apparatus are designed according to different optical functions. Moreover, the plural optical lens groups are fixed in the same casing, and the same optical sensor is shared by the plural optical lens groups. Consequently, the optical apparatus of the present invention has a single optical lens module, and is able to implement different optical function simultaneously. For example, the optical apparatus can acquire plural images corresponding to different optical functions in each capturing process. Consequently, the overall volume of the optical apparatus is minimized, and the fabricating cost of the optical apparatus is reduced. In other words, the optical apparatus of the present invention is industrially applicable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. An optical apparatus, comprising:

plural optical lens groups, wherein after a light beam passes through any of the plural optical lens groups, a travelling direction of the light beam is changed;

an optical sensor, wherein after the light beam passes through at least one of the plural optical lens groups, the light beam is sensed by the optical sensor; and a casing, wherein the plural optical lens groups and the optical sensor are accommodated and fixed within the casing, and the optical apparatus satisfies a mathematic formula:

$$0.75 \cdot A_s < \sum_{j=1}^{n} A_{C,j} < 1.5 \cdot A_s;$$

wherein $A_s$ is an effective sensing range of the optical sensor, $A_{c,j}$ is a projection range of the j-th optical lens group relative to the optical sensor, and n is a number of the plural optical lens groups.

2. The optical apparatus according to claim 1, wherein the plural optical lens groups comprise a first optical lens group with a first optical axis and a second optical lens group with a second optical axis, wherein the first optical axis and the second optical axis are not overlapped with each other.

3. The optical apparatus according to claim 1, further comprising a light shielding plate, wherein the light shielding plate is located at front sides of the plural optical lens groups, and the light shielding plate has plural perforations corresponding to the plural optical lens groups.

4. The optical apparatus according to claim 1, wherein one of the plural optical lens groups is a center optical lens group, and the other optical lens groups of the plural optical lens groups are peripheral optical lens groups around the center optical lens group.

5. The optical apparatus according to claim 1, wherein the plural optical lens groups comprise a first optical lens group with a first lens and a second optical lens group with a second lens, wherein the first lens and the second lens are integrally formed with each other.

6. The optical apparatus according to claim 1, wherein plural optical lens groups comprise a visible optical lens group and an invisible optical lens group, wherein after at least one visible light beam passes through the visible optical lens group, a travelling direction of the at least one visible light beam is changed, wherein after at least one invisible light beam passes through the invisible optical lens group, a travelling direction of the at least one invisible light beam is changed.

7. The optical apparatus according to claim 1, wherein each of the plural optical lens groups comprises a single lens or plural lenses in a stack arrangement, wherein each lens is made of a plastic material, a glass material or a silicon-based material.

8. The optical apparatus according to claim 1, wherein the plural optical lens groups comprise four optical lens groups or more than four optical lens groups.

9. The optical apparatus according to claim 1, wherein the optical apparatus is an optical image capturing apparatus.

10. An optical apparatus, comprising:

plural optical lens groups, wherein after a light beam passes through any of the plural optical lens groups, a travelling direction of the light beam is changed;

an optical sensor, wherein after the light beam passes through at least one of the plural optical lens groups, the light beam is sensed by the optical sensor; and a casing, wherein the plural optical lens groups and the optical sensor are accommodated and fixed within the casing, and the optical apparatus satisfies a mathematic formula:

$$0.3 \cdot f_{avg} < \Delta f < 1.2 \cdot f_{avg};$$

wherein $f_{avg}$ is an average of focal lengths of the plural optical lens groups, and $\Delta f$ is the largest focal length difference between the focal lengths of the plural optical lens groups.

11. The optical apparatus according to claim 10, wherein the plural optical lens groups have respective optical axes, wherein an inclined angle between any two of the optical axes of the plural optical lens groups is smaller than 10 degrees.

12. The optical apparatus according to claim 10, further comprising at least one filter, wherein the at least one filter is arranged between the plural optical lens groups and the optical sensor, wherein after the light beam passes through any of the plural optical lens groups, a portion of the light beam is filtered and sieved by the at least one filter.

13. The optical apparatus according to claim 12, wherein a visible light beam, an infrared light beam, a near infrared light beam and/or a far infrared light beam is blocked by the at least one filter.

14. The optical apparatus according to claim 10, wherein the optical apparatus further satisfies a mathematic formula:

$$0.75 \cdot A_s < \sum_{j=1}^{n} A_{C,j} < 1.5 \cdot A_s;$$

wherein $A_s$ is an effective sensing range of the optical sensor, $A_{c,j}$ is a projection range of the j-th optical lens group relative to the optical sensor, and n is a number of the plural optical lens groups.

15. The optical apparatus according to claim 10, wherein plural optical lens groups comprise a visible optical lens group and an invisible optical lens group, wherein after at least one visible light beam passes through the visible optical lens group, a travelling direction of the at least one visible light beam is changed, wherein after at least one invisible light beam passes through the invisible optical lens group, a travelling direction of the at least one invisible light beam is changed.

16. An optical apparatus, comprising:

a first optical lens group with a first lens and a second optical lens group with a second lens, wherein the first lens and the second lens are integrally formed with each other, and after a light beam passes through any of the first optical lens group and the second optical lens group, a travelling direction of the light beam is changed;

an optical sensor, wherein after the light beam passes through at least one of the first optical lens group and the second optical lens group, the light beam is sensed by the optical sensor; and a casing, wherein the first optical lens group, the second optical lens group and the optical sensor are accommodated and fixed within the casing, wherein the optical apparatus satisfies a mathematic formula:

$$0.75 \cdot A_s < \sum_{j=1}^{n} A_{C,j} < 1.5 \cdot A_s;$$

wherein $A_s$ is an effective sensing range of the optical sensor, $A_{c,j}$ is a projection range of the j-th optical lens group relative to the optical sensor, and n is a number of the plural optical lens groups, and wherein the optical apparatus satisfies a mathematic formula:

$$0.3 \cdot f_{avg} < \Delta f < 1.2 \cdot f_{avg}$$

wherein $f_{avg}$ is an average of focal lengths of the plural optical lens groups, and $\Delta f$ is the largest focal length difference between the focal lengths of the plural optical lens groups.

* * * * *